United States Patent
Miyawaki et al.

(10) Patent No.: US 6,259,386 B1
(45) Date of Patent: Jul. 10, 2001

(54) DEVICE AND METHOD FOR DATA OUTPUT AND DEVICE AND METHOD FOR DATA INPUT/OUTPUT

(75) Inventors: Hiroyuki Miyawaki; Takanobu Kondo; Yasuo Iwasaki, all of Kanagawa; Hisao Tanaka, Tokyo, all of (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/424,642

(22) PCT Filed: Mar. 25, 1999

(86) PCT No.: PCT/JP99/01508
§ 371 Date: Apr. 10, 2000
§ 102(e) Date: Apr. 10, 2000

(87) PCT Pub. No.: WO99/50849
PCT Pub. Date: Oct. 7, 1999

(30) Foreign Application Priority Data

Mar. 27, 1998 (JP) .................................................. 10-081270

(51) Int. Cl.$^7$ .................................................. H03M 7/00
(52) U.S. Cl. .................................. 341/60; 709/217; 348/13
(58) Field of Search .................................. 341/60, 50, 61; 358/403; 709/232, 217, 250; 348/13

(56) References Cited

U.S. PATENT DOCUMENTS

| | | | | |
|---|---|---|---|---|
| 5,440,336 | * | 8/1995 | Buhro et al. | 348/13 |
| 5,754,307 | * | 5/1998 | Miura | 358/403 |
| 5,944,796 | * | 8/1999 | Noritomi | 709/232 |
| 6,128,650 | * | 10/2000 | De Vos et al. | 709/217 |

* cited by examiner

*Primary Examiner*—Brian Young
*Assistant Examiner*—John B Nguyen
(74) *Attorney, Agent, or Firm*—Frommer Lawrence & Haug, LLP.; William S. Frommer; Gordon Kessler

(57) ABSTRACT

This invention relates to data input/output apparatus and the like, which are suitable to be applied to an AV server. As nonlinear accessible storage medium, there is provided with HDD array device (13). When a controller (11) of an AV server (10) receives a command for reproducing data from a minimum of two discontinuous areas in the HDD array device (13) in a first order, the HDD array device (13) then puts the command in an order such that a period of time for access is minimal to reads the data so that the read data are rearranged in the first order to be outputted through decoders (15) to (18). Thereby, the efficiency of data transfer is improved without complications.

17 Claims, 5 Drawing Sheets

DEVICE AND METHOD FOR DATA OUTPUT AND DEVICE AND METHOD FOR DATA INPUT/OUTPUT

INDUSTRIAL FIELD

The present invention relates to an apparatus and method for reading data, data input/output device and data input/output method, which are suitable to be applied illustratively to an AV (Audio and/or Video) server. More particularly, the invention relates to a data reading apparatus or the like in which, given a command for reading data in a first order from two or more discontinuous areas of a nonlinear accessible storage medium, the data are read in a second order such that a period of time required to access it is minimized, and then the read data are transferred with the read data being rearranged into the first order, whereby enhancing the data transfer rate without any inconveniences

BACKGROUND ART

With advances in the widespread acceptance of CATV (cable television) systems and the like of recent years accompanied by a large number of channels for offering varieties of information, the trend is giving rise to a need for a single audio-video data recording and reproducing apparatus which, unlike conventional VTRs (video tape recorders), records or reproduces simultaneously a plurality of channels of audio-video data or reproduces one channel of data while recording another channel of data. The need is being met by growing popularization of an apparatus called a video server (or AV (Audio and/or Video) server) for recording and reproducing audio and video data using nonlinear accessible storage medium such as hard disks.

Generally, video servers used by broadcasting stations need to have high data transfer rates to meet rigorous requirements of image and sound qualities, as well as large storage capacities for recording data for extended periods of time. Attempts to meet the above needs include the use of data recording and reproducing equipment comprising a plurality of hard disk (hereinafter called "HD") drives which may store video and audio data and which are accessible in parallel. Further, attempts to meet the needs for ensuring reliability include recording parity data in the event of failure of any HD drives.

A multi-channel video server is implemented which is capable of addressing diverse modes of use such that a VOD (video on demand) system or an NVOD (near video on demand) system is constituted, by recording raw data composed of a plurality of items of audio and video data in a distributed fashion so as to output multi-channel data simultaneously or reproducing the same raw data in a temporally staggered manner for multi-channel reproduction, even if a number of data channels required by the contents of programs or broadcasts offered by broadcasting stations is different.

The above type of video server employs a data recording and reproducing apparatus based on RAID (redundant arrays of inexpensive disks) techniques involving the use of a plurality of hard disk drives (called HDDs hereunder) each comprising a plurality of HDs, proposed in 1988 by Patterson et al., in "A Case for Redundant Arrays of Inexpensive Disks (RAID)", ACM SIGMOND Conference, Chicago, Ill., Jun. 1–3, 1998.

In the paper cited above, the RAID techniques are grouped into five categories: RAID-1 through RAID-5. RAID-1 is a technique for writing the same contents to two HDDs. RAID-3 is a technique for dividing input data into equal lengths and writing the divided data to a plurality of HDDs while generating parity data and writing the generated parity data to another HDD, the parity data being acquired by exclusive-OR'ing corresponding data blocks between HDDs. RAID-5 is a technique for enlarging data divisions (blocks) and writing each data division as a data block to one HDD, whereby the result of exclusive-OR'ing any two corresponding data blocks between HDDs (i.e., parity data) is written as a parity block to another HDD as well as to further HDDs in a distributed manner.

When reading data from at least two discontinuous areas of HDDs illustratively over a predetermined period of time, the above type of AV server (video server) reads the data in an order designated by a command.

Where data are read from the HDD areas in the command-designated order, the area order may or may not be advantageous for access to the HDD areas.

That is, when area order designated by command coincides with address order of the areas in the HDDs on which the data are recorded, reading the data from the areas in the order designated by command may be advantageous of less amount of access time. This is because the time to seek the HDDs in relation to access to the areas is minimized as head is moved according to the address order when reading the data.

On the other hand, when area order designated by command does not coincide with address order of the areas in the HDDs on which the data are recorded, the order designated by the command is disadvantageous because the head may not access the areas in the order designated by the command and then, the traveling distance of head over the areas is extended and the HDD seek time is prolonged.

It is therefore an object of the present invention to provide an apparatus for reading data, data input/output device and others whereby the efficiency of data transfer is enhanced.

DISCLOSURE OF THE INVENTION

Data input/output device according to the invention comprises a nonlinear accessible storage medium, a plurality of input and output processing means for outputting each of the data inputted within a time slot allocated thereto to the storage medium and for outputting each of the data read from the storage medium within a time slot allocated thereto, and control means for bringing the data read from the storage medium and outputted to the input and output processing means under control, when command of reading data in a At order from a minimum of two discontinuous areas of the storage medium is received, by putting the command in a second order such that an access time required for reading the data from the storage medium areas is minimized, wherein the input and output processing means rearranges the data read from the storage medium in the second order by the control means into the first order and outputs them.

Data input/output method according to the invention for recording each of the data on nonlinear accessible storage medium by a plurality of data processing means within a time slot allocated thereto and reading the data recorded on the storage medium to output them comprises a first step of receiving a command for reading the data recorded on the storage medium in a first order from a minimum of two discontinuous areas of the storage medium, a second step of putting the command received in the first step in a second order such that an access time required for reading the data from the storage medium is minimized, a third step of reading the data put in the second step in the second order from said storage medium and a forth step of rearranging the data read in the third step into the first order and outputting them through the plurality of data processing means.

An apparatus for reading data according to the invention comprises a nonlinear accessible storage medium, a plurality of data processing means for reading and outputting each of the data recorded on the storage means within a time slot allocated thereto, and control means for bringing the data read from the storage medium in a second order and output them to the data processing means under control, when command for reading data recorded on the storage medium in a first order from a minimum of two discontinuous areas of the storage medium is received, by putting the command in the second order such that an access time required for the data from the storage medium is minimized, wherein the data processing means rearranges the data read from the storage medium in the second order by the control means into the first order and outputs them.

Method for outputting data according to the invention for reading each of the data recorded on nonlinear accessible storage medium by a plurality of data processing means within a time slot allocated thereto and outputting them comprises a first step of putting a command for reading the data recorded on the storage medium in a first order from a minimum of two discontinuous areas of the storage medium, in a second order such that an access time required for the data from the storage medium is minimized when the command is received, a second step of reading from the storage medium the data put in the first step in the second order and a third step of rearranging the data read in the second step into the first order and outputting them through the plurality of data processing means.

When a command for reading data in a first order from a minimum of two discontinuous areas of the storage medium is received, the control means reads the data in a second order such that a an access time required for the data from the storage medium is minimized and supplements the read data to the processing means. Further, from the processing means, the read data is rearranged in the first order and then, they are outputted. This allows the access time required to read data from the minimum of two discontinuous areas of the storage medium, to be minimized, thereby boosting the efficiency of data transfer.

PREFERRED EMBODIMENT

Figure 1:
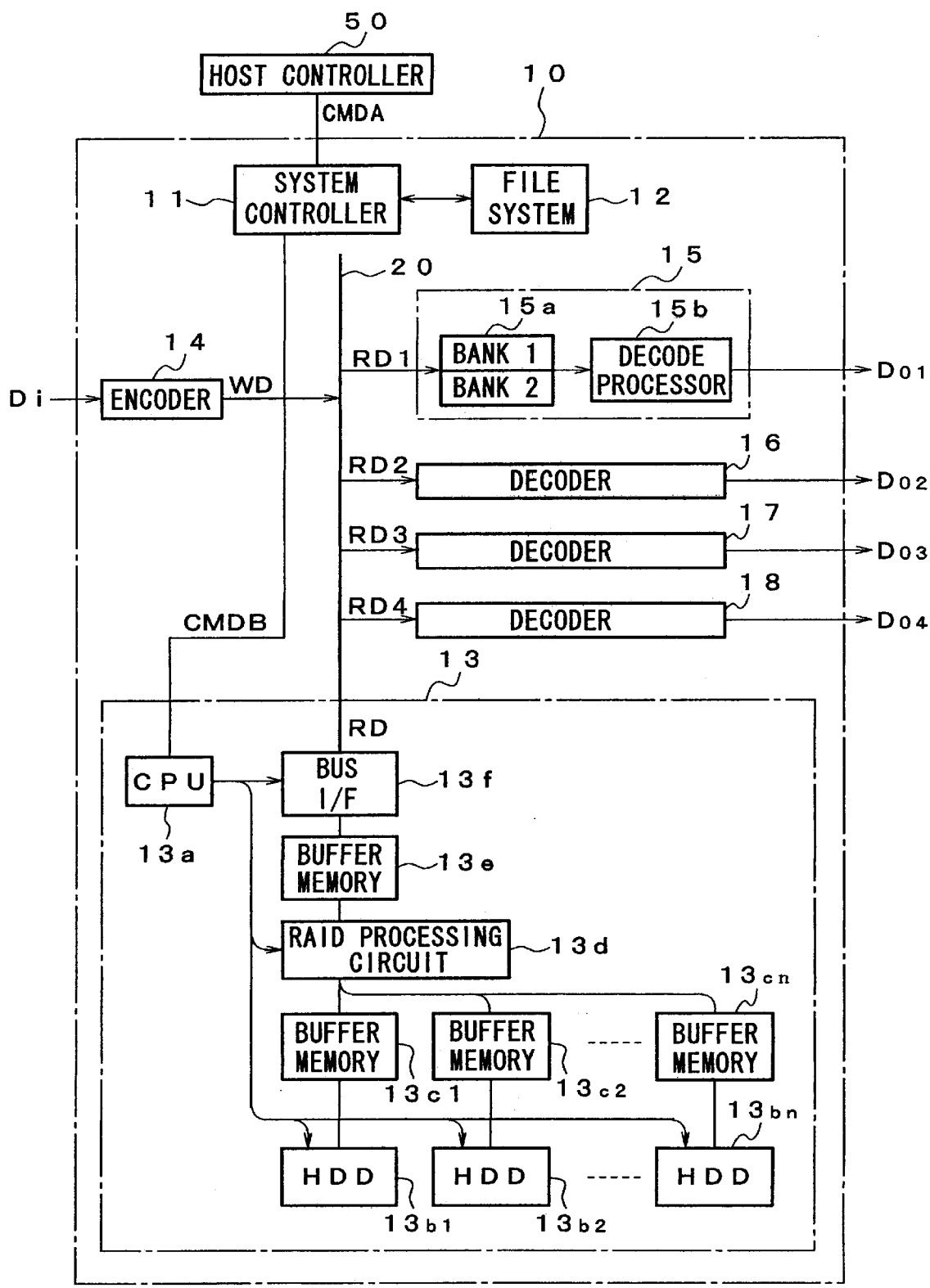
FIG. 1 is a block diagram showing a configuration of an AV server embodying the invention.

A preferred embodiment of this invention will now be described with reference to the accompanying drawings. FIG. 1 is a block diagram showing an entire AV server 10 embodying the invention, The AV server 10 principally includes a system controller 11, a plurality of data input and output processing parts 14, 15, 16, 17, 18, an HDD array device 13, as a whole. In FIG. 1, an example that one encoder 14 and four decoders 15, 16, 17, 18 are configured as the plurality of data input and output processing parts 14, 15, 16, 17, 18 is illustrated. A plurality of configuration is conceivable other than the above; however, in order to simplify the explanation thereof in this embodiment, the explanation will be carried out based on the configuration of the data input and output processing parts 14, 15, 16, 17, 18 as illustrated in FIG. 1.

Next, respective configurations will be explained more in detail.

As shown in FIG. 1, AV server 10 is connected to a host controller 50 and AV server 10 operates based on a received control command from the host controller 50. As the control commands, various commands is conceivable such as command of recording file A on HDD of the HDD array device or command of outputting the recorded file B from the decoder 15.

A system controller 11, which is an interface between the host controller 50 and AV server 10, issues various commands to respective blocks, to be described later, when it receives the control command from the host controller 50.

The file system 12 is used for managing the files recorded on the HDD array device 13 and is information indicating which address on logical address of HDD starts recording the data in a file unit, respectively, and how long the data are recorded continuously. The details thereof will be described.

The encoder 14 receives data Di input from the external including audio and/or video data (hereinafter called "AV data" unless otherwise specified) and converts them into the data recordable to HDD array device 13. If the data Di input from the external illustratively are the data with a serial digital interface (SDI) format standardized by society of motion picture & television engineering (SMPTE-259M) or the data with a serial digital transfer interface (SDTI) format standardized by SMPTE-305M, the data are decoded and then the necessary AV data are extracted therefrom. Further, it is conceivable that the data with asynchronous transfer format such as asynchronous transfer mode (AT and fibre channel are decoded and the AV data are extracted therefrom. Additionally, the encoder 14 may perform compressing process on the AV data as required. The compressing process utilizing interframe correlation such as MPEG and motion-JPEG, intraframe compressing process such as DV and JPEG and the like are conceivable as compressing process. The encoder 14 outputs the data WD with format recordable on the HDD array device 13.

The decoders 15, 16, 17, 18 convert the data received from the HDD array device 13 to the data with format such that the data may be outputted to the external, and output the data including AV data. When the data are the data WD compressed by the encoder 14, the decoders 15, 16, 17, 18 perform expansion process on them and encode the data so as to form the data with external transmission format such as the above SDI and SDTI formats to output the data DO. In an example as shown in FIG. 1, decoder 15 is composed of two banks 15a for storing the data RD and a decode processor 15b. The banks 15a is memories for temporarily storing the data RD from the HDD array device 13. The decode processor 15b encodes the data so as to form the data with a transmission format for the above expanding process and the external transmission as required. Other decoders 16, 17, 18 have the same configuration as that of decoder 15.

When each of the input and output processing parts 14, 15, 16, 17, 18 receive time slot signal from a time slot generating circuit, no shown, these plurality of input and output processing parts 14, 15, 16, 17, 18 perform some process such as the above compressing process and expanding process thereon so that it looks from the external as if the input and output processing on the data are carried out simultaneously.

Banks 15a of the decoder 15 allow the bank 1, for example, to store the data read from the HDD array device 13 within a time slot allocated thereto and read the data temporarily stored on the bank 1 within next time slot allocated thereto to output them to the decode processor 15b as well as they allow bank 2 to store the data read from the HDD array device 13 temporarily. Further, the banks 15a perform process of putting the data in the output order of the data or file based on control command from host controller 50, which will be described later more in detail.

The HDD array device 13 is composed as called RAID configuration wherein a plurality of HDDs 13b are arranged so as to connect one in parallel with another.

CPU 13a issues control command of controlling each of the HDDs 13b and the like based on control command CMDB from system controller 11.

The HDDs 13b1, 13b2, - - - , 13bn are storage media for storing AV data outputted from the encoder 14. This embodiment adopts called RAID-3 configuration wherein a plurality of HDDs 13b1, 13b2, - - - , for storing video data in relation to the video data and HDD 13bn for storing parity data on video data to keep redundancy are formed. Audio data may be stored on areas of HDDs 13b1, 13b2, - - - , 13bn different from the areas storing the video data in the HDDs 13b1, 13b2, - - - , 13bn, which store video data, or on another HDD, not shown, different from the HDDs 13b1, 13b2, - - - , 13bn, which store video data. When audio data are stored on the HDD different from the HDDs 13b1, 13b2, - - - , 13bn, which store video data, it is conceivable that RAID-1 wherein a plurality of HDDs are formed may be used.

As data transfer rate from respective buffer memories 13c1, 13c2, - - - , 13cn to each of the HDDs 13b1, 13b2, - - - , 13bn is different from that from buffer memory 13e to the HDDs 13b1, 13b2, - - - , 13bn, the buffer memories 13c1, 13c2, - - - - , 13cn are memories used for reducing the difference of their data transfer rate.

RAID processing circuit 13d performs process of writing and reading data to and from the HDDs 13b1, 13b2, - - - , 13bn. This is, when performing process of writing the data to the HDDs 13b1, 13b2, - - - , 13bn, the data received through bus 20 are divided (striped) into some pieces in a bit unit so that they may correspond to each of the plurality of HDDs 13b1, 13b2, - - - , 13bn and then, an arithmetic of error correction coding data (for example, parity data) in relation to respective bit data is performed so that the parity data may be written to the HDD 13bn. Further, when performing process of reading the data recorded on the HDDs 13b1, 13b2, - - - , 13bn, the data read from respective HDDs 13b1, 13b2, - - - , 13bn are multiplexed and outputted, and if the data are not read from the HDDs 13b1, 13b2, - - - , 13bn, the parity data recorded on the HDD 13bn are read and after error correction is performed thereon, the data are multiplexed and outputted.

As data transfer rate of the data bus 20 is different from that from buffer memory 13e to the buffer memories 13c1, 13c2, - - - , 13cn, the buffer memory 13e is memory used for reducing the difference of their data transfer rate.

Bus IF 13f is an interface between the data bus 20 and HDD array device 13.

Operation of the AV server 10 formed as the above will be described.

The encode 14 receives the data Di inputted from the external including AV data, performs some process such as compressing process on them as required and converts them into the data WD with format recordable to respective HDDs 13b1, 13b2, - - - , 13bn constituting HDD array device 13. The data WD thus converted and outputted are supplied to the bus I/F 13f through the data bus 20 within a time slot allocated thereto. In this time, the system controller 11 transmits to CPU 13a the address information indicating which free area in each of the HDDs 13b1, 13b2, - - - , 13bn should store the data, based on a list of free area of the file system 12, which will be described later, and the CPU 13a superimposes the data the bus IF 13f receive with the address information to output them to the buffer memory 13e. The data temporarily stored on the buffer memory 13e are outputted to RAID processing circuit 13d which outputs the data in a bit unit.

The data outputted from buffer memories 13c1, 13c2, - - - , 13cn are stored on a predetermined area in respective HDDs 13b1, 13b2, - - - , 13bn.

Next, an operation that the data recorded on respective HDDs 13b1, 13b2, - - - , 13bn are reproduced and outputted to the external will be described.

The system controller 11 received from the host controller 50 the control command CMDA instructing the reproduction of a predetermined file (or program) from a predetermined decoder refers to the system file 12 which area of respective HDDs 13b1, 13b2, - - - , 13bn stores the file.

The file system 12 will be described.

The file system 12 is a list indicating which recording area of the storage medium stores the data in a file unit or a program unit and which area of the storage medium is recordable area that nothing has been recorded (empty area, namely, free space).

Figure 2A:
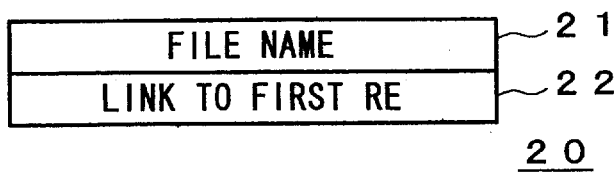
FIGS. 2A through 2F are views explaining file entry, record entry and free space list constituting a file system.
Figure 2B:
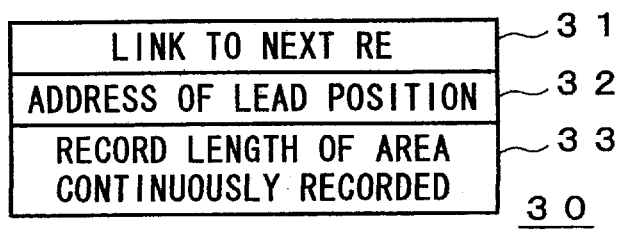
Figure 2C:
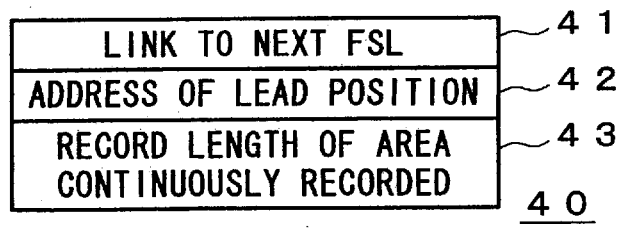

The file system 12 comprises a file entry 20, a record entry 30 and a free space list 40, as shown in FIGS. 2A through 2C.

The file entry 20 comprises a file name 21 and a pointer 22 to first record entry (RE) 30, as shown in FIG. 2A. This file entry 20 is produced in each file unit.

The record entry 30 comprises a pointer 31 to next record entry, an address 32 of lead position of HDD from which the file is recorded and data of record length 33 of the continuously recorded address area, as shown in FIG. 2B.

Figure 2D:
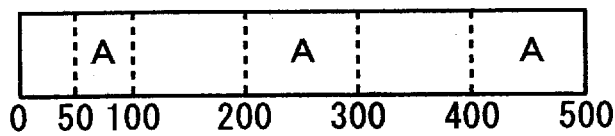
Figure 2E:
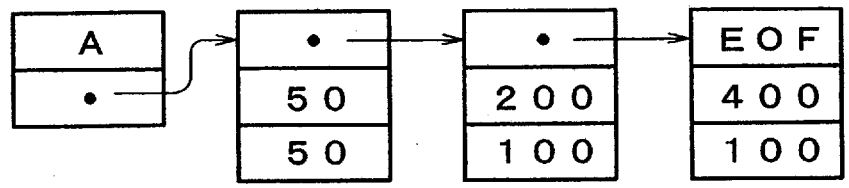
Figure 2F:
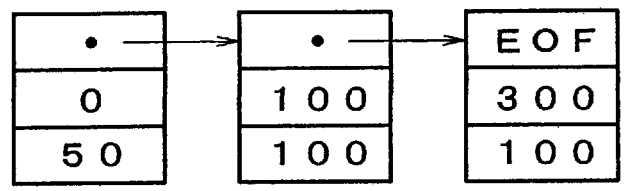

When file A is recorded on address space of HDD at intervals such as addresses 50 to 100, 200 to 300 and 400 to 500, as shown in FIG. 2D, the file entry 20 and the record entry 30 are illustrated in FIG. 2E; the file entry 20 of the file A comprises file name of "A" and a pointer value to a first record entry, the record entry 30 comprises a target pointer of the first record entry, the address "50" of lead position and the record length "50" of continuously recorded area. As the continuously recorded area is intermittent at address of 100 and net starts at address of 200, the address of lead position is configured at 200 and the record length of continuously recorded area is configured at 100. Further, as the file "A" restarts recording thereof from address of 400, the address of lead position is configured at 400 and the record length of continuously recorded area is configured at 100. In this case, as no link to the next record entry, the term, "EOF (end of file)" is stored.

The free space list 40 comprises pointer value 41 indicating a target pointer to next free space list (FSL), an address 42 of lead position and record length 43 of continuously recorded area, as shown in FIG. 2C; as the addresses of free spaces are configured at 0 to 50, 100 to 200 and 300 to 400 on the address space as shown in FIG. 2D, the free space list 40 is a list showing of free spaces including continuously recorded address area starting lead address "0" up to address "50" (i.e., up to address "50"), continuously recorded address area starting lead address "100" up to address "100" (i.e., up to address "200") and continuously recorded address area starting lead address "300" up to address "100" (i.e., up to address "500").

By referring to the file system 12 thus composed, the system controller 11 can grasp which area of HDD records the file the host controller 50 directs.

The system controller 11 issues control command CMDB instructing the read of the file the CPU 13a of HDD array device 13 directs based on the control command CMDA from the host controller 50. The control command CMDB illustratively includes the above address information of the directed file.

The CPU 13a received the control command CMDB issues control command instructing the read of the directed file to respective HDDs 13b1, 13b2, - - - , 13bn. This command includes address information of the directed file so that HDDs 13b1, 13b2, - - - , 13bn can grasp which area of HDD given file is read from.

Each of HDDs 13b1, 13b2, - - - , 13bn read the data from the directed area based on control command issued from the CPU 13a and transfers the read data to buffer memories 13c1, 13c2, - - - , 13cn.

The data temporarily stored in the buffer memories 13c1, 13c2, - - - , 13cn are outputted to RAID processing circuit 13d wherein the read data are multiplexed and the multiplexed data are outputted to the decoders 15, 16, 17, 18 via buffer memory 13e, bus IF 13f and data bus 20.

When the command CMDA issued from the host controller 50 gives indication of outputting the directed file from any decoders, the CFU 13a controls the data the bus IF receives so that they may be outputted to the directed decoder.

Figure 3:
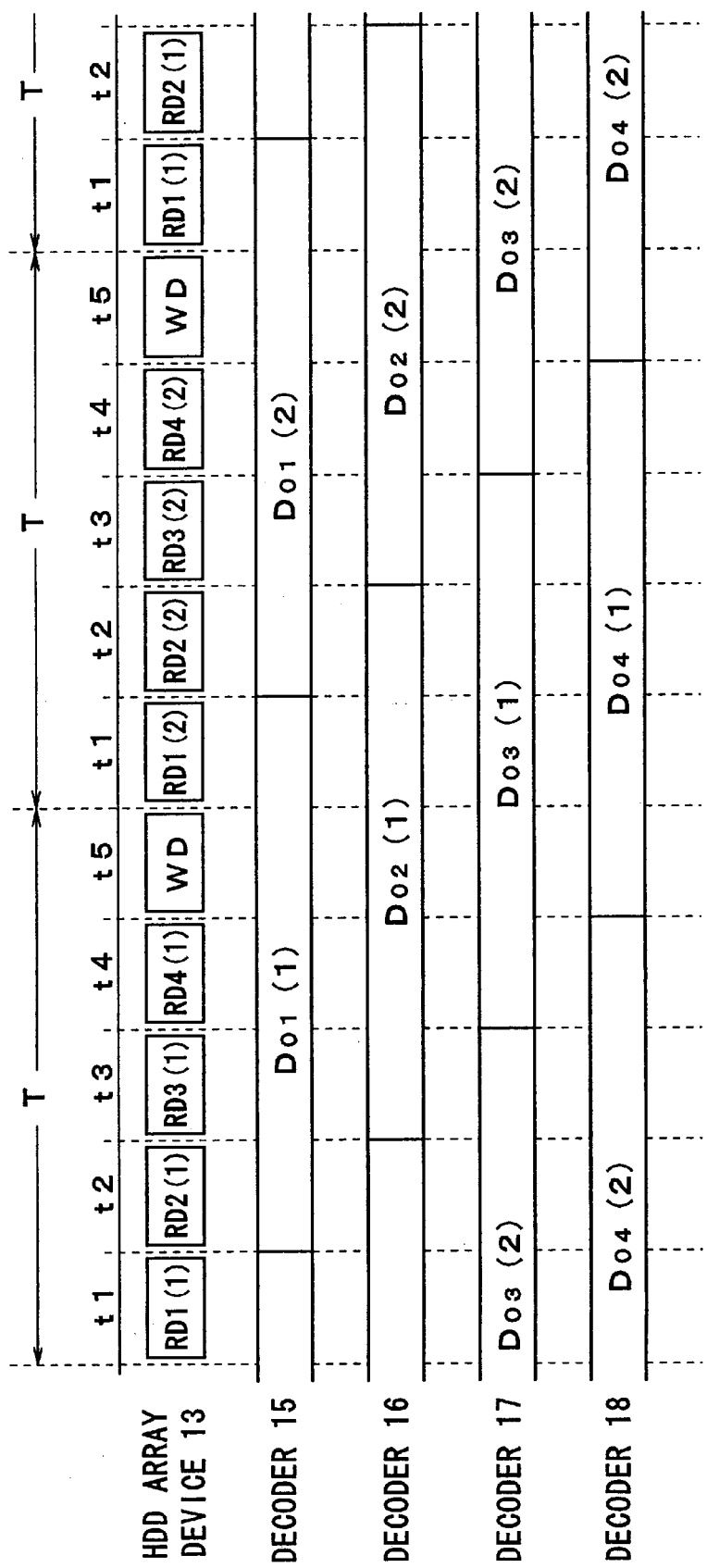
FIG. 3 is a view outlining a time slot sequence.

As described above, the encoder 14, the decoders 15, 16, 17, 18 respectively operate within a time slot allocated thereto. FIG. 3 shows an outline of a series of time slot processing.

Time slots t1, t2, t3, t4, t5 are allocated in turn to four decoders 15, 16, 17, 18 and one encoder 14, as shown in FIG. 3 and then, time slots t1, t2, t3, t4, t5 are allocated again in turn to four decoders 15, 16, 17, 18 and one encoder 14, thereafter they are repeated.

The decoder 15 receives data RD (1) from respective HDDs 13b1, 13b2, - - - , 13bn through data bus 20 within the time slot t1 allocated to the decoder 15 and stores the data on the bank 1, for example. Further, it outputs the data RD (1) stored in the bank 1 as external output data D01 following the next time slot t2 allocated to the decoder 16. Once again, it stores data RD (2) in bank 2 through data bus 20 within the time slot t1 allocated to the decoder 15. As, during this time slot t1, it outputs from the bank 1 the data RD (1) stored within the time slot t1 formerly allocated thereto, it can read the data RD1 (2) into the bank 2 within this time slot Similarly, the decoder 16 read out data RD2 (1) from the HDD array device 13 within the time slot t2 allocated to the decoder 16 and stores the data on the bank 1 and outputs the data RD2 (1) stored in the bank 1 as eternal output data D02 (1) until the time slot t2 next allocated to the decoder 16 is finished while it stores the data RD2 (2) on the bank 2 from the HDD array device 13 within the time slot t2, thereafter the above operations are repeated. The decoders 17, 18 operate similarly.

Decoder processor 15b performs the expansion process and/or the external transmission format converting process on each of the data outputted from the bank 15a, said data thus performed being outputted to the external.

In the AV server 10 thus composed and operated, if the control command CMDA issued from the host controller 50 includes command giving instruction to read out a plurality of files when order of the instructed files coincides with order of the record address in the recorded HDD, the head of HDD has a less amount of traveling distance in the area of HDD. When order of the instructed files does not coincide with order of the record address in the recorded HDD, the head of HDD has much amount of traveling distance so that seek time of HDD is prolonged, thereby allowing it having few practical application to AV server for broadcasting station, which broadcasts AV data in real time.

In this invention, when receiving the command giving instruction to reproducing a plurality of files in turn, the read order of each files are changed such that an access time of the head to HDD may be minimum and then, respective HDDs output the data to the external with the head reading out the data actually according the above changed order.

Figure 4:
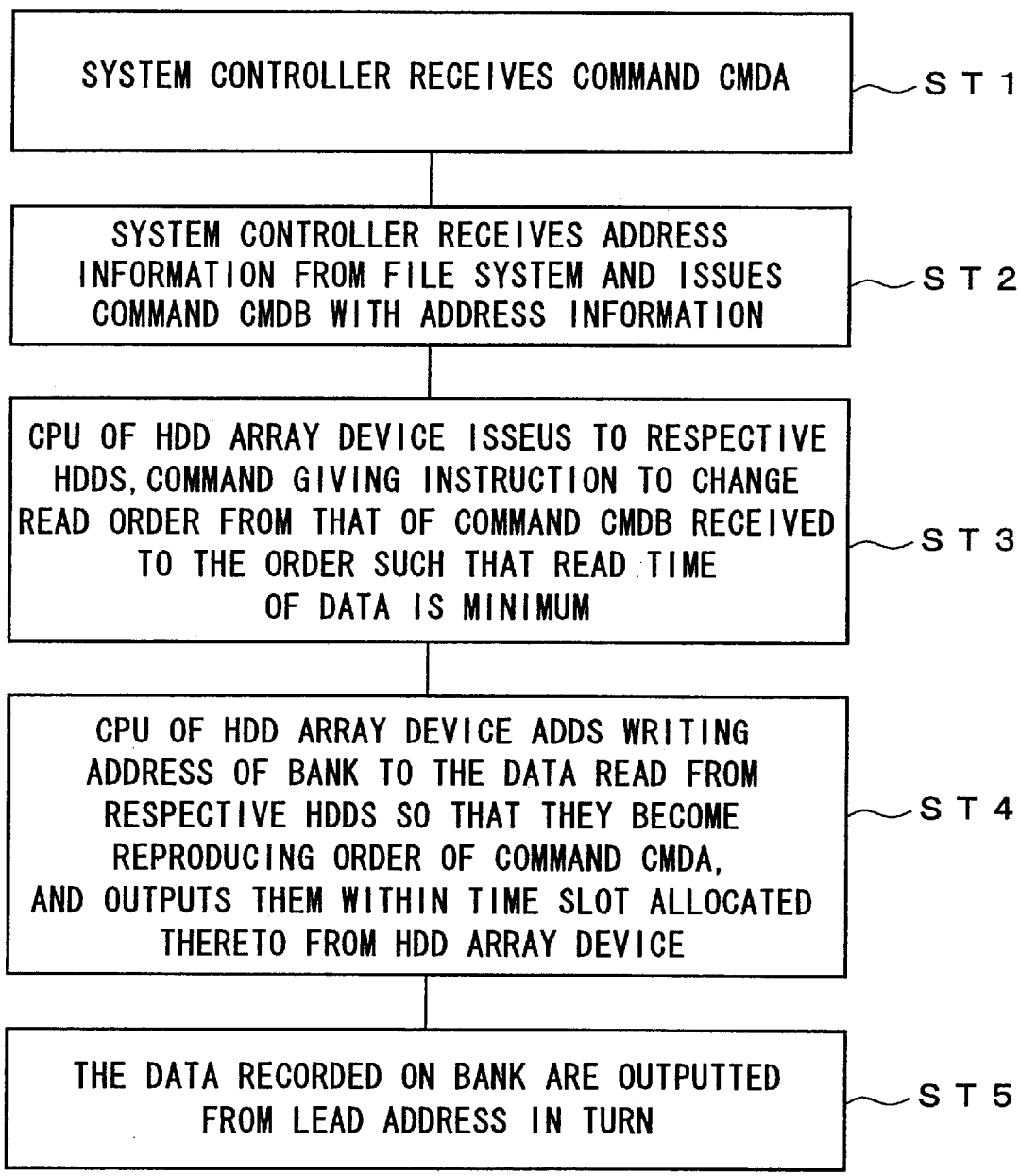
FIG. 4 is a flowchart explaining the processing when a reproduction command is received.

Following control process will be described according to the flow chart shown in FIG. 4.

Suppose that the host controller 50 issues command CMDA giving instruction to "reproduce files Pa, Pb and Pc successively from the decoder 15", in order to simplify the explanation of its process, in this embodiment, and the process will be explained.

In step ST1, the system controller 11 of the AV server 10 receives the above command CMDA from the host controller 50 and the processing proceeds to Step ST2 wherein the system controller 11 receives respective address information ADa, ADb and ADc indicating which areas of the HDD store the files Pa, Pb and Pc by referring to the file system 12. Said address information ADa, ADb and ADc illustratively include information about the above file entry and record entry every files. Further, it issues control command CMDB including the address information ADa, ADb and ADc to the HD array device 13. Namely, it issues the control command giving instruction to reproduce the address information ADa, ADb and ADc in turn and transmit them to the decoder 15, to the HDD array device 13.

Next, the processing proceeds to Step ST3 wherein the CPU 13a of the HDD array device 13 received the command CMDB from the system controller 11, determines which file is stored in a lead address according to respective address information ADa, ADb and ADc. As the address information ADa, ADb and ADc include record entry every files thus described, it compares their first lead position addresses in the record entry one with another, changes read order of files into an order such that the data can be read from the file of which lead position address has the smallest address information, in turn, and issues the control command to respective HDDs 13b1, 13b2, - - - , 13bn. It may be conceivable that the control command give instruction to change the read order to an order such that the data may be read from the file of which lead position address has the largest address information, in turn.

Change of the order given by the reproduction command based on lead address value recorded on the HDD allows access time of the head to HD to be minimized.

Figure 5:
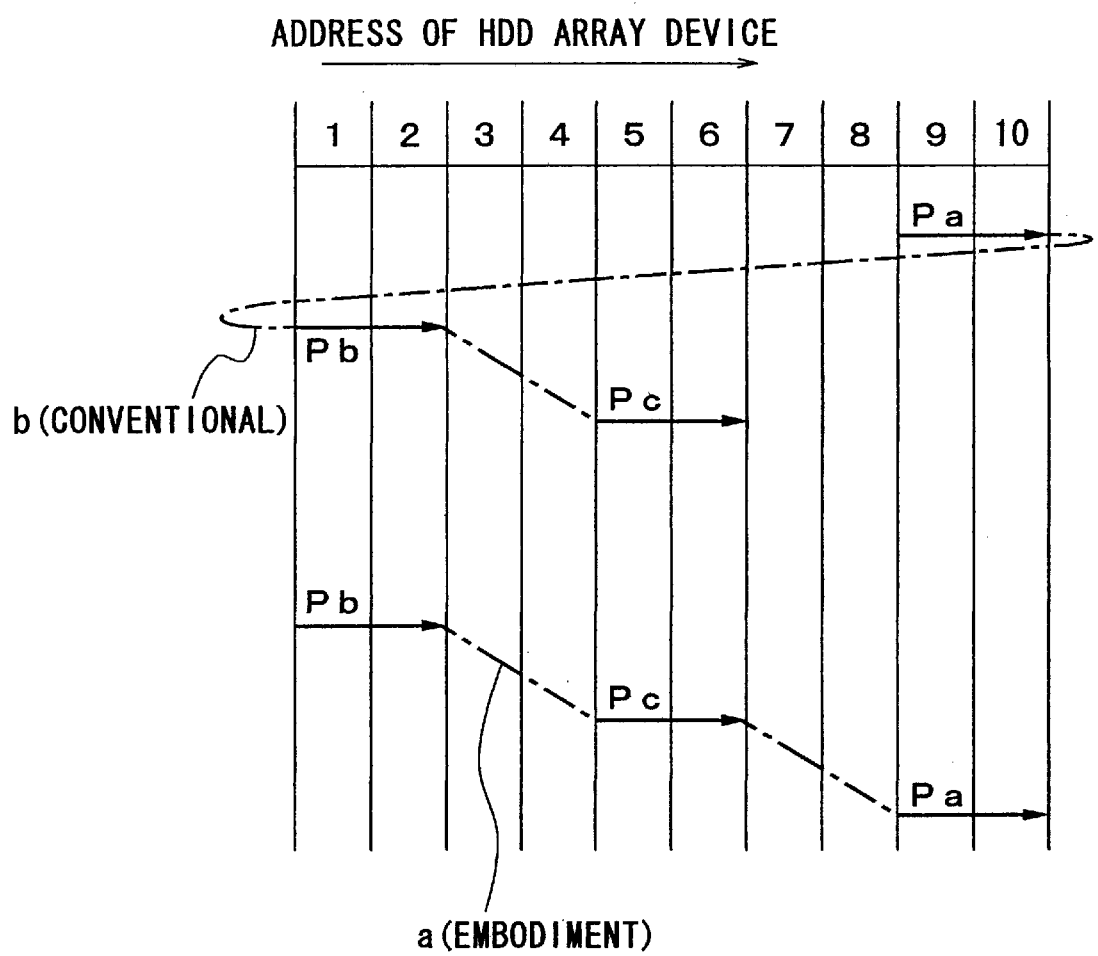
FIG. 5 is a view showing a comparison between a conventional data reading order and the data reading order provided by the embodiment.

Namely, if files Pa, Pb and Pc respectively are stored on the addresses 9 to 10, 1 to 2 and 5 to 6 of HD when the data are read according to the reproducing order directed by the host controller 50, as shown in FIG. 5, the head travels from address 10 to address 1 for seeking after reading out the file Pa and then the head travels from address 3 to address 5 for seeking after reading out the file Pb, as shown in a dot-dash line b, while, when changing the read order as above, the file Pb is read out and the head travels from address 3 to address 5 for seeking and then, the head travels from address 7 to address 9 for seeking after reading out the file Pc so that the file Pa is read out. Therefore, as compared with the conventional reading, the access time of the embodiment is shortened by time when the head does not travels from address 10 to address 1 for seeking after reading out the file Pa (exactly, time that subtracts seek time from address 7 to address 9 from seek time from address 10 to address 1).

In the Step ST3, the CPU 13a issues the control command giving instruction to change the reproducing order, as described above, and then, the processing proceeds to Step ST4 wherein the data read from respective HDDs 13b1, 13b2, - - - , 13bn based on the control command are outputted to the bus IF 13f through the buffer memories 13b1, 13b2, , 13bn, RAID processing circuit 13d and buffer memory 13e.

In the bus format on the data bus 20, a header is added to the lead of data. Address of decoder 15 and writing address in the bank of decoder may be inserted into this header.

Namely, the data supplied to the bus IF 13f hold the read order thereof changed by the CPU 13a. In order to change it to the reproducing order represented by the command issued from the host controller 50, it instruct the writing address to the bank 15a of the decoder 15 to become its order when they are read out of the bank 15a. As the control command CMDB issued from the system controller 11 to the CPU 13a includes the record entry information of each of the files, the amount of data of respective files can be grasped and the address value of the bank can be given based on the amount of data when the data are transferred from the bus IF 13f to the decoder 15.

For example, in the example shown in FIG. 5, the data are transferred from the bus IF 13f to the bank 15a of decoder 15 in the sequence of files Pb, Pc, Pa while, as each file has an amount of data corresponding to the amount of address 2, address value is inserted instructing so that writing address of the bank starts writing at address 2, for example, when transferring the file Pb, address value is inserted instructing so that writing address of the bank starts writing at address 4 when transferring the file Pc and address value is inserted instructing so that writing address of the bank starts writing at address 0 when transferring the file Pa. Such insertion of a value instructing writing address of the bank into the header of data causes the files to be outputted according to the reproducing order instructed by the host controller 50 by illustratively starting reading at address 0 of the bank 15a in turn.

The processing proceeds to Step ST5 wherein the data written in the bank are read sequentially from the lead address and outputted.

The access time may be shortened according to the invention when a plurality of files are read out of respective HDDs 13b1, 13b2, - - - , 13bn within a time slot allocated thereto as described above so that an amount of data transformable within one time slot is increased and a number of encoders and decoders (number of channels) are also increased, thereby improving image quality by increasing amount of transferred data.

With this embodiment, the CPU 13a issues the control command giving instruction to change the reproducing order of the files while it is conceivable that the system controller 11 previously changes the reproducing order of the files so that the data access time is shortened and the CPU 13a issues the control command CMDB giving instruction to read the data according to the above changed order.

With this embodiment, the CPU 13a controls so that the writing address of the bank in relation to the read data supplied to the bus IF 13f becomes the reproducing order instructed by the host controller 50 while it is also conceivable that it controls so that writing instruction of the bank address is performed on input data of RAID processing circuit 13d instead of the data supplied to the above bus IF 13f.

In the above-described embodiment, HD is described as storage medium for recording audio and/or video data while another nonlinear accessible storage medium such as magneto-optical disc, for example, MO and DVD, and semiconductor memory, for example, flush memory and DRAM may be used.

Industrial Applicability

As has been described above, an apparatus and method for reading data, data input/output device and data input/output method according to the invention are suitable to be applied illustratively to an AV server used for signal transmission system such as CATV.

What is claimed is:

1. Data input/output device comprising:
   a nonlinear accessible storage medium;
   a plurality of input and output processing means for outputting each of the data inputted within a time slot allocated thereto to said storage medium and for outputting each of the data read from the storage medium within a time slot allocated thereto; and
   control means for bringing the data read from the storage medium and outputted to the input and output processing means under control, when command for reading data in a first order from a minimum of two discontinuous areas of the storage medium is received, by putting the command in a second order such that an access time required for reading the data from the storage medium areas is minimized,
   wherein the input and output processing means rearranges the data read from the storage medium in the second order by the control means into the first order and outputs them.

2. The data input/output device according to claim 1, further comprising data managing means storing address information of the data recorded on said storage medium,
   wherein, when receiving said command, said control means reads said data from the storage medium by putting said first order in the second order to allow the data recorded on areas of said storage medium to be read in recorded order by referring the address information from said data managing means.

3. The data input/output device according to claim 2, wherein said address information is composed of information including a start address in said storage medium, said address starting recording said data, and area length of said storage medium on which the said data are recorded continuously.

4. The data input/output device according to claim 1, wherein at least one of said plurality of input and output processing means further comprises compressing means for compressing at least video data out of the input data and outputting them to said storage medium, and expanding means for expanding the compressed video data recorded on said storage medium.

5. The data input/output device according to claim 1, wherein at least one of said plurality of input and output processing means further comprises an SDI decoding means for decoding the input data formatted by SDI transmission format and exacting therefrom audio and/or video data; and an SDI encoding means for encoding said data read from said storage medium to form the data with SDI transmission format.

6. The data input/output device according to claim 1, wherein at least one of said plurality of input and output processing means further comprises an SDTI decoding means for decoding the input data formatted by SDTI transmission format and exacting therefrom audio and/or video data; and an SDTI encoding means for encoding said data read from said storage medium to form the data with SDTI transmission format.

7. The data input/output device according to claim 1, wherein each of said plurality of input and output processing means comprises memory means composed of at least a first bank and a second bank, each temporarily storing said data read from said storage medium, wherein said data read from said storage medium within said first time slot allocated thereto is stored on the first bank of said memory means, said data read from said storage medium within said second time slot allocated thereto is stored on the second bank of said memory means, and then, said data stored on said first bank are outputted from said first bank until a period of the second time slot is finished.

8. The data input/output device according to claim 7, wherein said control means controls so as to allow said data read from said storage medium in said second order to be inputted to said input and output processing means by designating writing address to said first bank or second bank, when said data read from said storage medium in said second order are written to said first bank or second bank, to put said data outputted from said first bank or second bank into said first order.

9. Data input/output method for recording each of the data on nonlinear accessible storage medium by a plurality of data processing means within a time slot allocated thereto and reading the data recorded on the storage medium to output them, the method comprising the steps of:

a first step of receiving a command for reading the data recorded on the storage medium in a first order from a minimum of two discontinuous areas of the storage medium;

a second step of putting the command received in the first step in a second order such that an access time required for reading the data from the storage medium is minimized;

a third step of reading the data put in the second step in the second order from said storage medium; and a forth step of rearranging the data read in the third step into the first order and outputting them through the plurality of data processing means.

10. The data input/output method according to claim 9, wherein said second step includes putting said first order in the second order to allow the data recorded on areas of said storage medium to be read in recorded order by referring the address information of the data recorded on said storage medium.

11. The data input/output method according to claim 10, wherein said address information is composed of information including a start address in said storage medium, said address starting recording said data, and area length of said storage medium on which the said data are recorded continuously.

12. The data input/output method according to claim 9, wherein at least one of said plurality of data processing means compresses at least video data out of the input data and outputs the compressed video data to record them on said storage medium, within the time slot allocated thereto, and expands at least compressed video data out of said data read from said storage medium within the time slot allocated thereto to output them.

13. The data input/output method according to claim 9, wherein at least one of said plurality of data processing means decodes the input data formatted by SDI transmission format and extracts therefrom audio and/or video data to output them to said storage medium, and it encodes said data read from said storage medium to form the data with SDI transmission format and outputs them.

14. The data input/output method according to claim 9, wherein at least one of said plurality of data processing means decodes the input data formatted by SDTI transmission format and extracts therefrom audio and/or video data to output them to said storage medium, and it encodes said data read from said storage medium to form the data with SDTI transmission format and outputs them.

15. The data input/output method according to claim 9, wherein each of said plurality of data processing means comprises memory means composed of at least a first bank and a second bank, each temporarily storing said data read from said storage medium, wherein said forth step comprises:

a step of writing said data read from said storage medium in said second order on the first bank of said memory means within said first time slot allocated to said one of said plurality of data processing means;

a step of writing said data read in said second order on the second bank of said memory means so as to allow them to be read in sad first order within said second time slot allocated to said one of data processing means at a next cycle of said first time slot; and a step of outputting said data written on said first bank until a period of second time slot is finished.

16. An apparatus for reading data comprising:

a nonlinear accessible storage medium;

a plurality of data processing means for reading and outputting each of the data recorded on said storage means within a time slot allocated thereto; and control means for bringing the data read from the storage medium in a second order and output them to the data processing means under control, when command for reading data recorded on the storage medium in a first order from a minimum of two discontinuous areas of the storage medium is received, by putting the command in the second order such that an access time required for the data from the storage medium is minimized, wherein the data processing means rearranges the data read from said storage medium in the second order by the control means into the first order and outputs them.

17. Method for outputting data for reading each of the data recorded on nonlinear accessible storage medium by a plurality of data processing means within a time slot allocated thereto and outputting them comprising the steps of:

a first step of putting a command for reading the data recorded on the storage medium in a first order from a minimum of two discontinuous areas of the storage medium, in a second order such that an access time required for the data from the storage medium is minimized when said command is received;

a second step of reading from the storage medium the data put in the first step in the second order; and a third step of rearranging the data read in the second step into the first order and outputting them through the plurality of data processing means.

* * * * *